June 23, 1931.     A. K. MOSLEY     1,811,277
PIPE CONNECTER
Filed June 15, 1929

Inventor:
Abraham K. Mosley.
by Lloyd Burke
His Attorney

Patented June 23, 1931

1,811,277

UNITED STATES PATENT OFFICE

ABRAHAM K. MOSLEY, OF TROY, NEW YORK, ASSIGNOR TO BESSIE K. STOLL, OF TROY, NEW YORK

PIPE CONNECTER

Application filed June 15, 1929. Serial No. 371,154.

My invention relates to improved means for connecting sections of pipe intended for use as conduit for low or moderate pressures of water, gas, air or other fluids, and more particularly relates to a pipe connecter of the sleeve or ferrule type especially intended for joining sections of pipe such as is commonly used as leader pipes in conjunction with eaves gutters on dwellings and other buildings.

The object of the invention is to provide a sleeve joint which may be economically produced from sheet metal and applied to sections of any ordinary pipe, whether of cast metal, or rolled or drawn from sheet metal.

A further object of my invention is to provide a joint which may be simply and easily applied to sections of pipe intended for low or negligible pressures without any auxiliary locking or sealing means, and which, with the aid of suitable elastic composition, jointing cement or solder, is adapted to withstand moderately higher pressures of water, gas, air or other fluids.

Other objects and advantages resulting from my invention will appear in the course of the following description in connection with the accompanying drawings, and the novel features thereof are more specifically pointed out in the appended claims.

Figure 1:
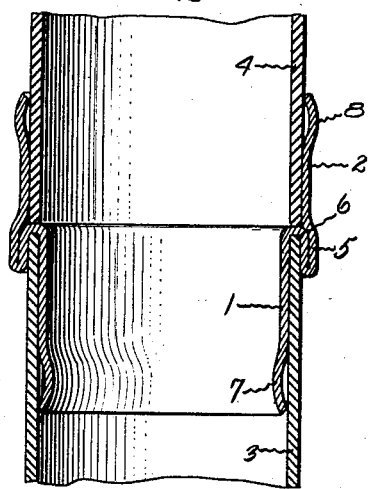
Figure 2:
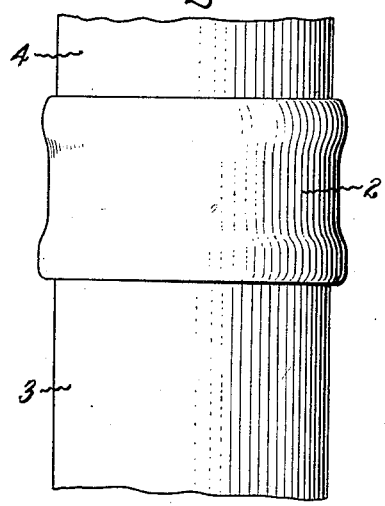
Figure 3:
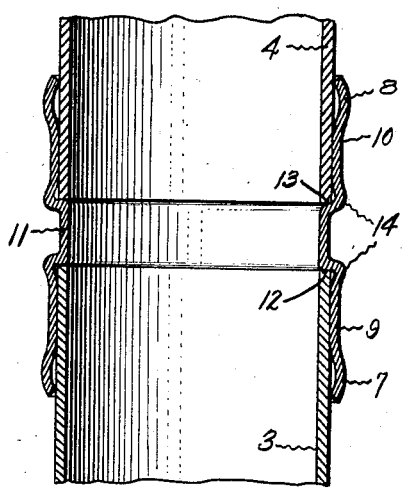
Figure 4:
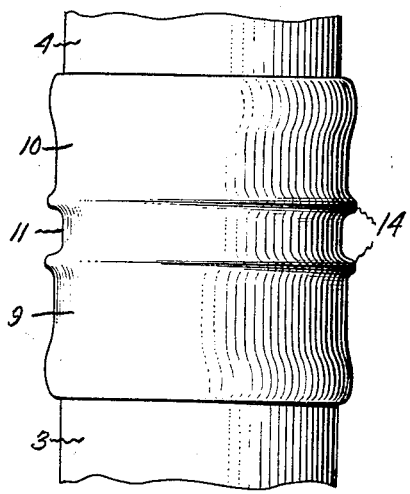
Figure 5:
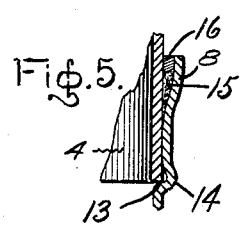

In the accompanying drawings, Fig. 1 is a sectional view of one form of pipe joint according to my invention, as applied to two pipe sections; Fig. 2 is a side elevation of the joint of Fig. 1; Fig. 3 is a sectional view, corresponding to Fig. 1, but showing a somewhat different form of pipe joint in accordance with my invention; Fig. 4 is a side elevation of the joint of Fig. 3, and Fig. 5 is a detail illustrating the manner of sealing the joint when intended for higher pressures.

As illustrated in the drawings, the pipe connecter consists of two oppositely extending ferrule portions and an intermediate portion formed to provide an abutment for the ends of the two pipe sections when assembled.

The connecter may be formed by rolling, spinning or other suitable method from sheet metal, and may be of any desired shape suitable for use with any ordinary form of pipe whether round, square, corrugated, or of other shape.

The device of Fig. 1 consists of the two oppositely extending ferrule portions 1 and 2 respectively adapted to be inserted into and to receive the adjacent ends of the pipe sections 3 and 4; the outer diameter of the portion 1, and the inner diameter of the portion 2 being respectively equal to the inner and outer diameters of the pipe sections. Intermediate these ferrule portions 1 and 2, the sheet metal of which the connecter is formed, is folded or bent to form a two-ply circumferential flange 5 formed concentrically with the inner end of the ferrule portion 1 and forming therewith a U-shaped channel or socket portion 6 adapted to receive and preferably grip the end of the pipe section 3; the inner and outer surfaces of the metal at the base of the U-shaped portion 6 thus form stops against which the ends of the pipe sections 3 and 4 respectively abut. Adjacent their outer ends, the walls of the ferrule portions 1 and 2 are respectively provided with curved or bead portions 7 and 8, each slightly concave with respect to the adjacent wall of the pipe section to which it is fitted. These curved portions 7 and 8 give to the extreme ends of the ferrule portions a certain amount of resiliency so they may be made to firmly engage the surfaces of the pipe sections, and also serve the additional purpose of providing space for cement, solder, or other sealing composition which may be applied in a manner to be hereinafter described, when the use of such an expedient is desirable for providing a tight joint. When the device is used as a joint for rain pipes, such sealing means is unnecessary.

The particularly neat outward appearance of the joint of Fig. 1 is illustrated in Fig. 2.

In Fig. 3, a somewhat different form of connecter is shown. In this case the two end portions 9 and 10 are alike and constitute outer ferrule portions adapted to fit over the ends of the pipe sections similarly to the ferrule portion 2 of the connecter of Fig. 1. Intermediate these ferrule portions 9 and 10, the connecter is provided with a central annular portion 11 having in inner diameter substantially equal to the inner diameter of the pipe section with which it is to be used; in the case illustrated, the material of the connecter is of substantially the same thickness as the material of the pipe, and the inner diameter of the intermediate annular portion 11 is substantially the same as that of the pipe sections thus forming two shoulders 12 and 13, against which the ends of the pipe sections abut. This form of connecter has the advantage that the bore of the conduit is continuous, and uninterrupted at the joint, which is not true in the case of the joint of Fig. 1. This feature is desirable in conduits for some purposes.

At either edge of the central annular portion 11, and at the root or base of each of the ferrule portions 9 and 10, a bead or corrugation 14 is formed to give a substantial degree of resiliency to the ferrule portions 9 and 10 which are preferably made to fit rather snugly over the pipe sections. As in the case of Fig. 1, the walls of the ferrule portions 9 and 10 are provided with concave portions 7 and 8 adjacent their outer ends.

In the installation of leader pipes with joints such as shown in Figs. 1 and 3, it will ordinarily be unnecessary to apply sealing cement to the joints; if in some instances it may be desirable, the surfaces of the ferrule portions which engage the pipe sections may be coated with cement, white lead or other jointing paint. In instances where a solder joint is desirable, the mouth or orifice of the outer ferrule portion 2 of the connecter of Fig. 1, or of both ferrule portions 9 and 10 of the connecter of Fig. 3, may be first opened or expanded by means of a conical wedge shaped piece of wood, such as plumber's top, thereby providing space for a gasket 15 to be inserted, as illustrated in Fig. 5, and then soldered as at 16. It will be noted that the in-turned lips of the concave portions 7 and 8 serve to secure the solder and prevent it from drawing away from the surfaces of the pipe sections, as frequently results from temperature changes.

While I have described and illustrated the preferred forms of the pipe connecter of my invention, it is apparent that certain modifications are possible without departing from the spirit of my invention, the scope of which is set forth in the appended claims.

What I claim as new and desire to secure by Letters Patent of the United States, is:

1. A pipe connecter formed from sheet metal comprising two ferrule portions of different diameters, the smaller of said ferrule portions adapted to fit the interior diameter of one of two pipe sections to be joined, and the larger of said ferrule portions adapted to fit the exterior diameter of the other of said pipe sections, and an intermediate portion folded upon itself to form a two-ply axially extending annular flange concentric with the inner end of the smaller of said ferrule portions and forming therewith a U-shaped channel adapted to receive and firmly grip the end of the respective pipe section, the inner and outer surfaces of the base of said U-shaped channel portion comprising abutments for the ends of the pipe sections to be joined.

2. A pipe connecter formed from sheet metal comprising two ferrule portions of different diameters, these ferrule portions being adapted respectively to fit the interior diameter of one and the exterior diameter of the other of two pipe sections to be joined, each of said ferrule portions being provided with a shallow corrugation adjacent its outer end, said corrugation being concave with respect to the surface of the pipe engaged by the respective ferrule portions, and an intermediate portion folded upon itself to form a two-ply axially extending annular flange concentric with the inner end of the smaller of said ferrule portions and forming therewith a U-shaped channel adapted to receive and firmly grip the end of the respective pipe section, the inner and outer surfaces of the base of said U-shaped channel portion comprising abutments for the ends of the pipe sections to be joined.

In witness whereof, I have hereunto set my hand this 14th day of June, 1929.

ABRAHAM K. MOSLEY.